Feb. 11, 1958 R. IMBERT ET AL 2,822,575
PROCESS AND MACHINE FOR THE CONTINUOUS PRODUCTION
OF SECTIONS FROM SYNTHETIC RESINS
Filed July 25, 1955 2 Sheets-Sheet 1
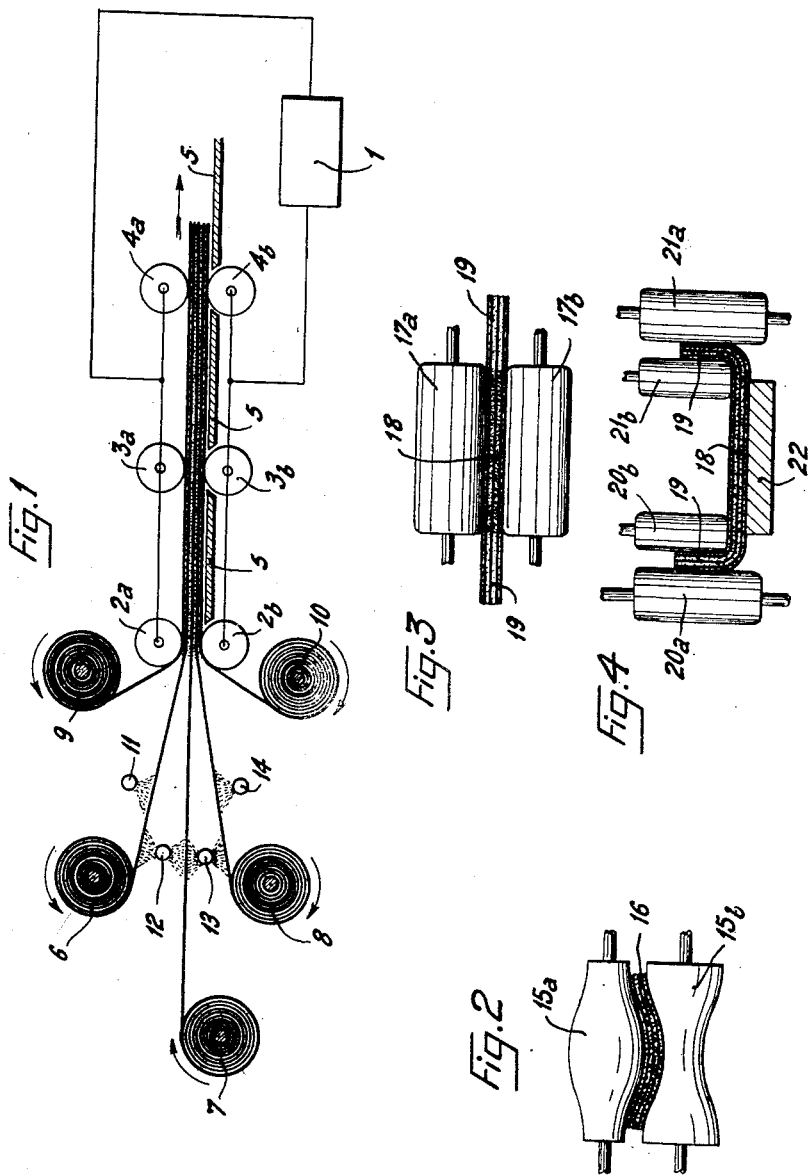

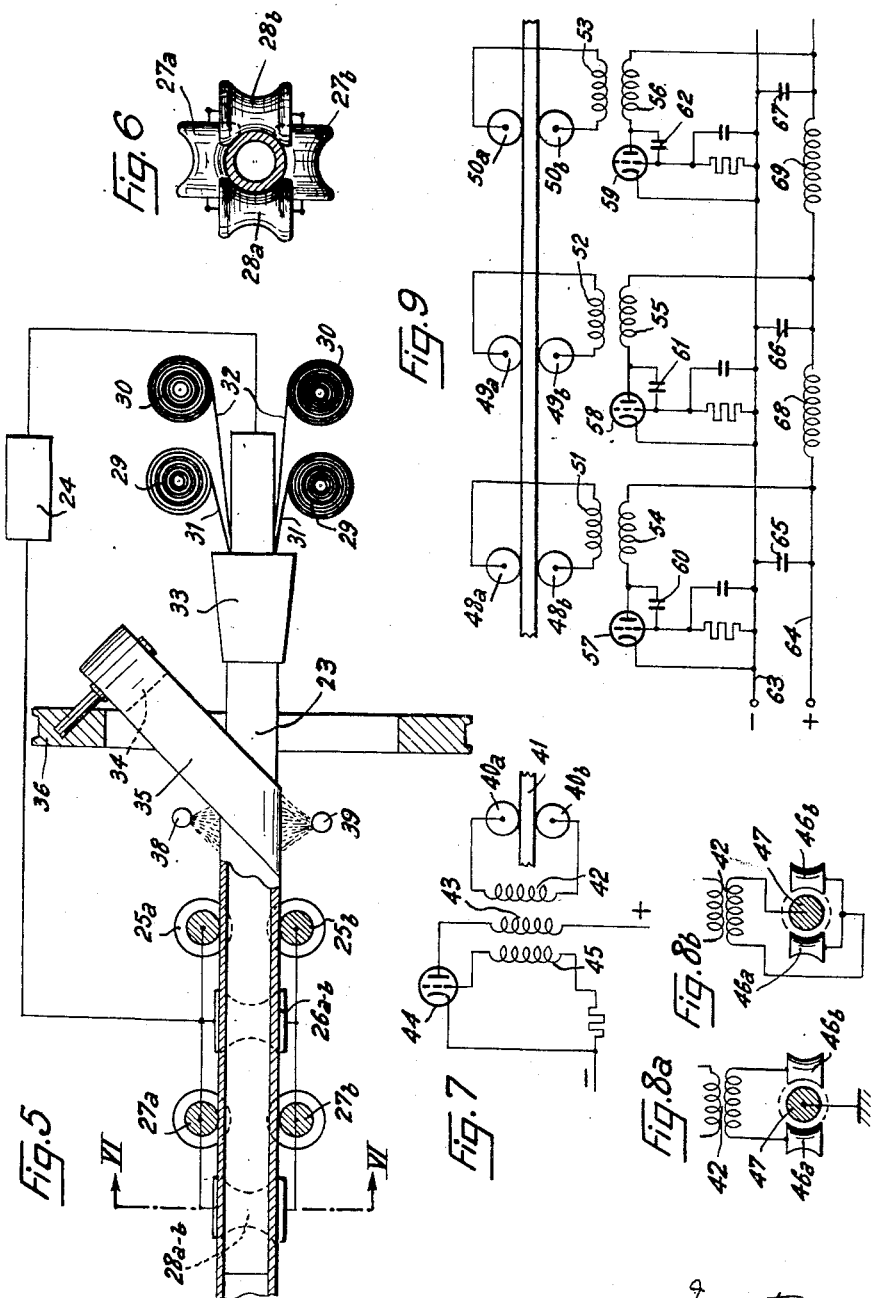

United States Patent Office 2,822,575
Patented Feb. 11, 1958

2,822,575

PROCESS AND MACHINE FOR THE CONTINUOUS PRODUCTION OF SECTIONS FROM SYNTHETIC RESINS

René Imbert and Pierre De Vinzelles, Casablanca, Morocco

Application July 25, 1955, Serial No. 524,107

Claims priority, application France July 29, 1954

5 Claims. (Cl. 18—10)

Synthetic materials obtained by polymerization or polycondensation processes and available in fluid condition but capable of being hardened through a heat and/or chemical treatment are more and more employed for producing a wide variety of articles. It is a conventional practice to associate such materials with reinforcements, particularly to impregnate fibrous reinforcements with such materials and, in some cases, to superimpose a plurality of fiber webs thus impregnated with a view to obtaining a final laminated product made up of fibrous strata impregnated with resin; the fibrous reinforcements may be made of glass fibers, for example felted into a mat, or weaved, braided, knitted or likewise made into fabrics wherein the component fibers extend in particular directions instead of at random.

As starting materials for the manufacture of laminates, unsaturated polyesters produced from the reaction of polyacids with polyalcohols (at least one of the monomers being an unsaturated compound) and which are still in flowing condition, the big molecules thereof being substantially linear, are particularly desirable. For effecting a cross-linking between the big linear molecules and thereby hardening the polyester, a cross-linking monomer which may additionally play the part of a solvent for the linear polyester may be empoyed. With a view to causing or promoting hardening, an accelerator or drying agent may be added.

Unsaturated linear polyesters which are commonly employed are ethylene glycol polymaleates or polyfumarates, or allyl polyphthalates.

For the purpose of accelerating the rate of setting, acyl peroxides (benzoyl, lauroyl, capryl and like peroxides), ketones such as methyl ethyl ketone, ketone peroxides, in particular cyclohexanone peroxide, cyclohexyl hydroperoxide, tertiary butyl peroxide, diazo compounds and so on, are employed as catalysts by amounts of about 0.1 to about 5 percent. As promoters, cobalt salts, particularly cobalt naphtenate or cobalt maleate, manganese salts, aromatic polyamines, dimethyl aniline and other compounds are usually employed, depending upon the catalyst which is selected.

Whether polyester or epoxide (ethoxylin) resins are considered, setting is effected in most cases with the help of heat or anyhow can be caused in that way. For that reason and for the sake of convenience, polyester resins and epoxide resins will be considered herein as members of the general class of thermo-setting resins.

This invention generally relates to the manufacture of hard sections, reinforced or not, from fluid or pasty resins which are capable of being given a predetermined shape and whose hardening can be effected by applying heat thereto; such resins will hereinafter be referred to as thermosetting materials. The invention relates more particularly to the continuous production of hard sections, whether reinforced or not, having an indefinite length and constant cross-sections, for example plates, sheets, bands, tubing and the like.

It is a main object of this invention to promote hardening or setting of the thermosetting materials referred to with a relatively low expense of energy.

This invention firstly comprises a process for hardening thermosetting materials by passing successive but spaced apart trains of high-frequency electrical waves therethrough. As an electric wave train is released, it causes, through dielectric losses, an internal heating which is distributed homogeneously through the whole mass traversed by the waves, and either as a consequence of or parallelly to said heating, an exothermic reaction is initiated more particularly in the case of unsaturated polyesters; the exothermic reaction may proceed after the wave train has ceased to pass and presumably corresponds to a starting or a continuance of cross-linking reactions.

With alternating periods of passage of high frequency current and periods of rest, it is thus possible to increase the temperature in the thermosetting material by successive heat supplies which are delivered partly from outside with a consumption of electrical energy and partly, in the periods of rest, by chemical internal reactions which have been started electrically.

It is then found that the period for obtaining a hard product is greatly reduced and may be of the order of one second or a few seconds.

The most effective frequencies (which vary in accordance with the materials to be treated) are of the order of one megacycle to several hundreds of megacycles, particularly of the range of about 30 to about 50 megacycles. Instead of continuously passing the material through a curing zone or spaced-apart curing zones as will hereinafter be described, setting may be promoted by passing one or several wave trains through the material. In that case, the period of passage of a wave train may be of the order of a quarter of a second. It is generally desirable to pass at least two and up to ten or more wave trains, separated by rest intervals of the order of two to fifteen seconds.

According to the preferred embodiment of this invention, the thermosetting material is passed at a predetermined rate through high frequency electrical wave generating zones, which are stationary and mutually spaced apart, so that each cross-section of the material is acted upon by wave trains in the conditions above defined, and the material is shaped or formed to the desired cross-section in at least one of said zones while said material is being subjected to the action of electrical waves; the material may be treated in the form of an uninterrupted length of any extent, or in the form of successive sections.

For carrying the preferred embodiment into effect, this invention comprises a shaping and curing machine in which the essential parts comprise a group of complementary shaping members made of a conducting material, inserted in a high frequency electrical circuit and defining between them a channel of predetermined cross-section for shaping the material which passes therethrough to the desired cross-section. All shaping members or some of them may be stationary; for example they may include a table providing a support and or comprise rollers. The complementary shaping members are employed as plates for condensers in which the dielectric is constituted by the material passed through the channel or gap between said shaping members. In practice, the machine comprises several successive groups of complementary shaping members. Each group thus plays a double part, viz. maintaining an alternating potential difference between opposite surfaces of the thermosetting material, and mechanically shaping the material to the desired cross-section.

For preventing the thermosetting material from sticking to the shaping members, a film of a mold release agent may be maintained or kept up on the operative surface of the shaping members, or a strip or sheet of mold release agent may be passed between said operative surface and the surface of the thermosetting material.

Where laminated sections having constant cross-sections are to be produced continuously a machine according to this invention may comprise before the first group of shaping members, one or more spools each arranged for the delivery of a sheet or band of reinforcing fibrous material, and means located before the ingress of said sheet or band into the channel defined between the shaping members of the first group, for depositing thermosetting material, a catalyst if need be, and as the case may be an accelerator or promoter on said sheet or band, unless such ancillary material or materials have already been incorporated in said thermosetting material. The ancillary material or materials referred to may be deposited by spraying, dipping, spreading (e. g. with a knife), brushing or the like.

Other features and objects of this invention will become apparent from the following description of preferred embodiments thereof, when taken in conjunction with the accompanying drawings given by way of non-limiting examples.

Fig. 1 is a diagrammatic sectional elevation of a shaping and curing machine in accordance with this invention, for the production of sections having an indefinte length and constant, non-tubular sections.

Figs. 2 to 4 are elevation views of groups of shaping rollers.

Fig. 5, similar to Fig. 1, shows a like machine adapted for the production of an indefinite length of tubing.

Fig. 6 is a cross-section taken along line VI—VI on Fig. 5.

Fig. 7 is an electrical diagram of a high frequency device for applying a high alternating potential to a pair of shaping rollers.

Figs. 8a and 8b show modifications of the diagram of Fig. 7 in the case of the production of tubing.

Fig. 9 is another electrical diagram in which each pair of shaping rollers is associated with an oscillator.

Referring to the diagrammatic showing of Fig. 1, a shaping and curing machine for the production of sections having an indefinite length and constant, non-tubular cross-sections comprises three successive sets for shaping and applying high frequency electrical current which in this instance is supposed to be delivered from a common generator 1; each set comprises a group of two shaping rollers 2a—2b, 3a—3b, 4a—4b having complementary profiles, made of conducting material and connected in parallel to the terminals of generator 1. As shown, a table 5 for guiding and supporting the material in the process of treatment may be provided between the successive roller groups, and may extend as shown beyond the final shaping group 4a—4b.

Arranged before the shaping roller groups and rotatably supported for delivering individual webs of reinforcing fibrous material, for example glass fiber mats or glass fiber cloths, are spools 6, 7, 8; further spools 9, 10 are likewise arranged and supported to deliver individual films of mold release agent, for example regenerated cellulose films, for preventing the thermosetting material from sticking to the shaping rollers; arranged to spray thermosetting materials on each face of the fibrous material webs are nozzles 11, 12, 13 and 14; the thermosetting material may already contain a catalyst and, as the case may be, an accelerator or promoter; alternatively, further nozzles (not shown) may be provided to spray such ancillary agent or agents in the rear of the thermosetting material spraying zones. Finally squeezing devices (not shown) or equivalent devices for removing any excess thermosetting and ancillary materials from the fiber webs are preferably provided in the rear of the nozzles.

The shaping rollers such as 2a and 2b may be cylinders having smooth peripheral surface, or peripheral surface comprising portions in high or sunken relief, for example mottled or corrugated. Fig. 2 shows an example of a pair of rollers one of which 15a is bulged intermediate the ends thereof while the other one 16b has a corresponding groove, for producing a trough-shaped laminate 16.

It is possible to effect a stepwise shaping where the section to be produced should have a more complicated profile. Figs. 3 and 4 illustrate how such a stepwise shaping can be effected in the case where a U-shaped section is to be obtained.

In that case, the first shaping group or each one of the first shaping groups comprises two rollers 17a, 17b (Fig. 3) or less width than the web or webs impregnated with thermosetting material in order that only the middle portion 18 of the same is cured or partly cured by the action of said rollers while the marginal portions 19 are not or substantially not cured; in addition to the rollers referred to, side tables (not shown) may be provided to support said marginal portions 19. Following the shaping group or groups 17 are one or more groups of shaping rollers 20a—20b, 21a—21b (Fig. 4) having vertical axes, for causing curing or incipient curing of the marginal portions 19, previously bent up for example by skew guiding surfaces. Arranged to support the bottom face of the U-section 18 while the marginal portions are bent up and then cured, is a table 22.

Where shaping is thus effected by successive steps, it is generally desirable not to employ an accelerator or to apply such an accelerator only locally, at first on the middle portion 18 before it enters the nip between rollers 17a—17b, then past said rollers on the marginal portions 19 before said marginal portions reach rollers 20—21.

In the machine so far described, one or more groups of shaping rollers may be driven to cause progression of the material which is being cured; alternatively or additionally, roller groups adapted to draw the material may be provided after the last shaping roller group 4a—4b.

It should be understood that the foregoing example is not limiting and purports to illustrate various possibilities at the disposal of one skilled in the art. As stated above, feed spool such as 9 and 10 may be omitted and in that case provision should be made to maintain or renew a film of mold release agent on the rollers, tables and like parts of the machine.

Instead of being sprayed with thermosetting material and, as the case may be, ancillary materials which have not as yet been associated therewith, the fibrous webs supplied from spools such as 6, 7, 8 may be impregnated with thermosetting material by being passed through a vat containing the same, then if required squeezed or similarly handled and thereafter, as the case may be, sprayed with an accelerator before engaging the first group of shaping members. It should be understood that this invention is not restricted to any specific manner of impregnating fibrous webs with thermosetting materials.

Figs. 5 and 6 illustrate the arrangement of the essential parts (with a diagrammatic showing) of a shaping and curing machine designed for the production of tubing.

The essential parts comprise a central mandrel 23 made of conducting material, connected to a terminal of a high frequency wave generator 24, and successive groups of shaping members such as groups of grooved rollers 25a—25b, 26a—26b, 27a—27b and 28a—28b, each arranged around mandrel 23; for the sake of simplicity in the showing, it has been assumed that the various groups are connected in parallel to the other terminal of generator 24.

The machine further comprises means to provide an anti-adhesive sheath around the mandrel and means for covering said sheath with one or more fibrous webs impregnated with thermosetting material.

According to the example shown, the first means comprise spools 29, 30 for delivering regenerated cellulose films 31, 32 and a conical guide 33 for incurving the films and causing the same to fit around the mandrel into a split sheath.

The second means, of a well-known type, comprise one or several braked spools 34 adapted to deliver a web 35 of fibrous material and rotatably supported in oblique position on a turntable 36 borne on rollers. The mandrel 23 thus receives a simple or multiple helical winding of fibrous material. The numerals 38 and 49 denote nozzles for spraying thermosetting material on both faces of web 35; as described with reference to Fig. 1, additional nozzles may be provided to spray ancillary materials on the web at places where the web has already received thermosetting material.

Instead of winding fibrous web 35 directly around the regenerated cellulose films, it is possible to cover said films with intermediate fibrous webs impregnated with thermosetting material and arranged lengthwise like said films, then to wind web 35 spirally around said intermediate webs so that the drawing force in stripping the films is not applied directly to web 35 and thus is not likely to distort said web.

Alternately or additionally, the means for laying up fibrous webs may comprise a conical guide similar to guide 33 for causing a sheath of webs unwound from spools arranged like spools 29, 30, to be fitted around the regenerated cellulose sheath. In that case it is preferred to impregnate the inner face of each web before the web enters the conical guide, and to impregnate the outer face after the web egresses out of said guide. The conical guide 33 may also be arranged both for fitting the regenerated cellulose sheath around the mandrel and for fitting fibrous webs around said sheath.

Whether the first conical guide for fitting fibrous webs around the regenerated cellulose sheath is the conical guide 33 or is separate therefrom and located thereafter, said first guide may be followed with one or several similar guides adapted and arranged for laying up successive layers of fibrous material.

The above described manner of causing the material to progress through the machine shown on Fig. 1, is also applicable to the machine for the production of tubing according to Fig. 5.

Whatever the case may be, where a rotary shaping member is not cylindrical, it may comprise a pile of disks which are coaxial but mutually independent so that they can rotate at the same peripheral speeds in spite of their having different diameters.

With a view to applying a high alternating potential difference, preferably at a high frequency, any suitable source of alternating tension may be employed. In that respect, it is preferred to insert in an oscillating circuit tuned to resonance, the condenser which is provided by the shaping members together with the thermosetting material playing the part of a dielectric.

For that purpose, the oscillating circuit comprising such a condenser is preferably directly coupled with an oscillating tube to control the oscillating frequency of said tube, in order that any frequency shiftings caused by variations of the condenser capacity do not result in untuning the oscillating circuit. It should be understood in that regard that slight variations in the thickness of the material which is being treated or in the dielectric properties thereof are capable of altering the condenser capacity.

For example the mounting diagram shown on Fig. 7 may be employed. The condenser comprising a pair of shaping rollers 40a—40b and the material 41 to be shaped is connected to the ends of a winding 42 to provide an oscillating circuit. Magnetically coupled with winding 42 is another winding 43 inserted in the anodic circuit of a triode 44, and the oscillations are maintained by means of the grid circuit winding 45 which is also coupled magnetically with the first two windings.

With a view to causing the mounting to oscillate, the magnetic coupling of windings 42, 43 and 45 is variable; the frequency is determined by the oscillating circuit LC constituted by the induction coil 42 and the condenser 40a, 40b, 41.

For the purpose of bringing the alternating potential thus set up between members 40a, 40b to a level just below that corresponding to disruption of the dielectric 41, one of the windings, for example winding 43, may have a variable connection in order that the number of turns of the winding coupled with the oscillating circuit may be varied.

Where the shaping members are designed for the production of tubing, i. e. where they cooperate with an internal mandrel, any one of the mounting diagrams shown on Figs. 8a and 8b may be employed. Referring to Fig. 8a, shaping members 46a, 46b are connected to the ends of winding 42 while mandrel 47 is earthed or vice versa. In the case of Fig. 8b, one of the ends of winding 42 is connected to mandrel 47 while the other end of said winding is connected in parallel to the shaping members 46a, 46b.

Where several pairs of shaping members are provided to act successively on the thermosetting material, the various shaping members may be energized from the same alternating potential generator. Preferably each pair of shaping members is inserted in an oscillating circuit energized from an independent oscillating tube. The mounting may be as shown in Fig. 9.

Each pair of shaping members 48a—48b, 49a—49b, 50a—50b is associated with an induction coil, specifically coils 51, 52, 53, coupled with anodic coils 54, 55, 56 of triodes 57, 58, 59. In each one of the oscillators thus constituted a condenser 60, 61 or 62 provides for the required coupling between the grid and the anode, to maintain oscillations. Electrical energy is supplied to the oscillating mountings from a common source, which may be a low tension line 63 and a high tension line 64. With a view to avoiding parasitic couplings between the various oscillators condensers 65, 66 and 67, which may be associated with induction coils 68, 69, are provided so as to prevent high frequencies set up by an oscillator, from interfering with frequencies set up by an adjacent oscillator.

A machine similar to that shown on Fig. 5 may also be employed for the purpose of covering wires or cables, i. e. where a metal core which will remain within the final product is substituted for mandrel 23. In that case, the conical guide 33 may be arranged to act as a squeezing device for threads or the like impregnated with thermosetting material, which are delivered in a similar manner to films 31, 32 to provide a covering bundle around the core; around the bundle is then laid or wrapped a strip of regenerated cellulose film which for example is wound in the same manner as web 35, or the bundle may be covered with a mold release agent in any other manner. In that case, instead of placing the shaping rollers 25, 26, 27 etc. as shown on Fig. 5, i. e. shifting each pair of rollers by 90° with respect to the next preceding one, it is desirable to have a smaller shifting angle, for example to place the second pair at 60° from the first one, and the third pair at 120°.

Again, instead of connecting the pairs of rollers to a terminal of the source of current and the cable core to the other terminal, every second pair of rollers may be connected to one terminal and the other pairs to the other terminal.

It should be understood that this invention is not limited to the examples given above. In particular the reinforcing or filling material associated with the thermosetting material may be in any other form than that of fibers weaved or felted into a web, or no reinforcing or filling material at all may be employed. In that case, the machine may simply have, before the first group of shaping members, a device for the delivery of thermosetting material (as such or previously admixed with filling or reinforcing material), for example a die, an extruding head, a pair of rollers or the like which delivers a band, a strip, a sheet, a tube or like length of said thermosetting material or a mix containing the same.

What we claim is:

1. A process for the continuous production of sections having an indefinite length and constant cross-sections from a thermosetting material, which comprises passing said thermosetting material uninterruptedly through a series of at least two spaced apart, stationary curing zones at a rate corresponding to a duration of passage of about one quarter of a second through each zone, continuously passing electric waves of alternating electric current having a frequency above one megacycle through said material in each of said curing zones, and shaping said material to the desired cross-section in at least one of said zones while said material passes therethrough, the spacing of said curing zones being such as to correspond for said material to a period of passage of from two to fifteen seconds from the egress of one zone to the ingress into the next succeeding zone.

2. A machine for simultaneously shaping and curing a thermosetting material, which comprises a frame; a line of successive spaced-apart sets of complementary, rigid shaping rollers made of conducting material and revolubly borne in said frame, with the rollers in each set arranged in spaced-apart relationship across said line to provide between them a shaping gap of a predetermined cross-section; means supported from said frame for delivering thermosetting material into the shaping gap between the complementary shaping rollers of the set located at one of the ends of said line; means supported from said frame for driving said thermosetting material successively through the last-named shaping gap and the following shaping gaps; means supported from said frame between said sets for supporting said thermosetting material as it is driven from a shaping gap to the next following one; means in each set for electrically connecting the complementary shaping rollers via a self-induction coil, so as to provide an oscillating circuit in which said complementary shaping rollers and the thermosetting material therebetween constitute a condenser; and an oscillating device coupled electromagnetically with said self-induction coil for inducing electric oscillations in said oscillating circuit.

3. The machine of claim 2, each oscillating device comprising a vacuum-tube which has at least one anode, a cathode and a control grid; a coil in series with said anode, which is coupled electromagnetically with said self-induction coil; and means providing a reaction coupling between said anode and said control grid.

4. A machine for simultaneously shaping and curing a thermosetting material, which comprises a frame; a line of successive spaced-apart sets of complementary, rigid shaping rollers made of conducting material and revolubly borne in said frame, with the rollers in each set arranged in spaced-apart relationship across said line to provide between them a shaping gap of a predetermined cross-section; means supported from said frame for passing a fiber web successively through the shaping gap between the complementary shaping rollers of the set located at one of the ends of said line then through the following shaping gaps and past the last gap; means supported from said frame before said last-named set for impregnating said fiber web with thermosetting material; means supported from said frame for supplying a film of mold-release agent in each gap between said web thus impregnated with thermosetting material and the complementary shaping rollers providing said gap; means in each set for electrically connecting the complementary shaping rollers via a self-induction coil, so as to provide an oscillating circuit in which said complementary shaping rollers and the thermosetting material therebetween constitute a condenser; and an oscillating device coupled electromagnetically with said self-induction coil for inducing electric oscillations in said oscillating circuit.

5. A machine for the continuous producing of reinforced tubing from thermosetting material, which comprises a frame, a cylindrical rigid core made of a conducting material supported from said frame in a stationary position; a plurality of shaping and curing devices spaced-apart along said core, each of which comprises rigid grooved rollers made of conducting material, arranged in ring formation around said core to provide an annular passage between said rollers and said core, each roller being revolubly borne in said frame; means supported from said frame for passing a strip of mold-release agent through the successive annular passages provided by said shaping and curing devices, in sheath formation around said core; means supported from said frame for passing a fiber web in sheath formation through said successive annular passages and around said strip; means supported from said frame for impregnating said fiber web with thermosetting material before said web has reached the first of said successive annular passages; means in each shaping and curing device for electrically connecting the complementary rollers thereof with said core via a self-induction coil, so as to provide an oscillating circuit; and an oscillating device coupled electromagnetically with said self-induction coil for inducing electric oscillations in said oscillating circuit.

References Cited in the file of this patent

UNITED STATES PATENTS

| | | |
|---|---|---|
| 2,317,597 | Ford et al. | April 27, 1943 |
| 2,575,251 | Arnold | Nov. 13, 1951 |
| 2,668,133 | Brophy et al. | Feb. 2, 1954 |
| 2,705,993 | Mann et al. | Apr. 12, 1955 |
| 2,715,598 | Rees et al. | Aug. 16, 1955 |
| 2,727,560 | Bradley et al. | Dec. 20, 1955 |

FOREIGN PATENTS

| | | |
|---|---|---|
| 627,255 | Great Britain | Aug. 4, 1949 |

UNITED STATES PATENT OFFICE
CERTIFICATE OF CORRECTION

Patent No. 2,822,575                                        February 11, 1958

René Imbert et al.

It is hereby certified that error appears in the above numbered patent requiring correction and that the said Letters Patent should read as corrected below.

In the heading to the printed specification, line 8, for "Claims priority, application France July 29, 1954" read —Claims priority, application Morocco (French Zone) July 29, 1954—.

Signed and sealed this 20th day of May 1958.

(SEAL)
Attest:
KARL H. AXLINE
Attesting Officer

ROBERT C. WATSON
Commissioner of Patents